US012770976B2

(12) United States Patent
Zhang et al.

(10) Patent No.: US 12,770,976 B2
(45) Date of Patent: Oct. 20, 2026

(54) ELECTROCHEMICAL DEVICE

(71) Applicant: Amperex Technology Limited, Hong Kong (CN)

(72) Inventors: Yibo Zhang, Hong Kong (CN); Shengbo Lu, Hong Kong (CN); Chi Ho Kwok, Hong Kong (CN); Hong Sun, Hong Kong (CN); Chenmin Liu, Hong Kong (CN)

(73) Assignee: Amperex Technology Limited, Hong Kong (CN)

( * ) Notice: Subject to any disclaimer, the term of this patent is extended or adjusted under 35 U.S.C. 154(b) by 1022 days.

(21) Appl. No.: 17/953,811

(22) Filed: Sep. 27, 2022

(65) Prior Publication Data

US 2023/0044348 A1 Feb. 9, 2023

Related U.S. Application Data

(63) Continuation of application No. PCT/CN2020/081844, filed on Mar. 27, 2020.

(51) Int. Cl.
*H01M 50/451* (2021.01)
*H01M 10/0525* (2010.01)
(Continued)

(52) U.S. Cl.
CPC ..... *H01M 50/451* (2021.01); *H01M 10/0525* (2013.01); *H01M 50/44* (2021.01);
(Continued)

(58) Field of Classification Search
CPC .................................................. H01M 50/454
See application file for complete search history.

(56) References Cited

U.S. PATENT DOCUMENTS 9,508,974 B2 11/2016 Lee et al.
2014/0162110 A1 6/2014 Chen et al.
(Continued)

FOREIGN PATENT DOCUMENTS

CN 103441230 A 12/2013
CN 103904276 A 7/2014
(Continued)

OTHER PUBLICATIONS

Alexopoulos et al. "On the prediction of internal particle morphology in suspension polymerization of vinyl chloride. part i:: The effect of primary particle size distribution." Chemical engineering science 62.15 (2007): 3970-3983. (Year: 2007).*
(Continued)

*Primary Examiner* — Allison Bourke
*Assistant Examiner* — Kayla Elaine Clary
(74) *Attorney, Agent, or Firm* — Maier & Maier, PLLC

(57) ABSTRACT

An electrochemical device includes electrode plates and a separation layer formed on a surface of an electrode plate. The separation layer includes a porous layer formed on the surface of the electrode plate. The porous layer includes nanofibers. It takes 15 seconds or less for an electrolytic solution to infiltrate into the separation layer. The separation layer exhibits functions of a separator. Therefore, the electrochemical device achieves at least a relatively high energy density without using a stand-alone separator.

17 Claims, 1 Drawing Sheet

(51) Int. Cl.

| | |
|---|---|
| ***H01M 50/44*** | (2021.01) |
| ***H01M 50/443*** | (2021.01) |
| ***H01M 50/446*** | (2021.01) |
| ***H01M 50/454*** | (2021.01) |
| ***H01M 50/46*** | (2021.01) |
| ***H01M 50/491*** | (2021.01) |
| ***H01M 50/497*** | (2021.01) |

(52) U.S. Cl.

CPC ....... *H01M 50/443* (2021.01); *H01M 50/446* (2021.01); *H01M 50/454* (2021.01); *H01M 50/46* (2021.01); *H01M 50/491* (2021.01); *H01M 50/497* (2021.01)

(56) References Cited

U.S. PATENT DOCUMENTS

| | | | | |
|---|---|---|---|---|
| 2015/0118540 | A1* | 4/2015 | Fujiwara | H01M 50/429 429/144 |
| 2015/0221916 | A1* | 8/2015 | Lee | H01M 10/0525 429/254 |
| 2016/0049628 | A1* | 2/2016 | Kim | H01M 10/052 29/623.5 |
| 2019/0214623 | A1* | 7/2019 | Kimura | H01M 50/414 |
| 2020/0052277 | A1 | 2/2020 | Mou et al. | |

FOREIGN PATENT DOCUMENTS

| | | | |
|---|---|---|---|
| CN | 104024316 | A | 9/2014 |
| CN | 104040756 | A | 9/2014 |
| CN | 103460444 | B | 6/2016 |
| CN | 102610773 | B | 6/2017 |
| CN | 107039624 | A | 8/2017 |
| CN | 207217641 | U | 4/2018 |
| CN | 104979516 | B | 8/2018 |
| CN | 108598338 | A | 9/2018 |
| CN | 109524603 | A | 3/2019 |
| CN | 109802083 | A | 5/2019 |
| CN | 109980164 | A | 7/2019 |
| CN | 109980166 | A | 7/2019 |
| CN | 109994739 | A | 7/2019 |
| CN | 110197886 | A | 9/2019 |
| CN | 110212140 | A | 9/2019 |
| CN | 110364662 | A | 10/2019 |
| CN | 110729484 | A | 1/2020 |
| JP | 200225620 | A | 1/2002 |
| JP | 2013539186 | A | 10/2013 |
| JP | 2014505339 | A | 2/2014 |
| JP | 2015140902 | A | 8/2015 |
| JP | 2016534531 | A | 11/2016 |
| JP | 2018147744 | A | 9/2018 |
| JP | 201957358 | A | 4/2019 |
| KR | 1020160041493 | A | 4/2016 |

OTHER PUBLICATIONS

Office Action issued on Mar. 19, 2024, in corresponding Japanese Application No. 2022-558294, 4 pages.
Office Action issued on Aug. 20, 2024, in corresponding Chinese Application No. 202080094476.X, 18 pages.
Extended Search Report issued on Apr. 18, 2024, in corresponding European Application No. 209275155, 7 pages
International Search Report mailed Dec. 28, 2020, corresponding to International Application No. PCT/CN2020/081844; 8 pages (with English Translation).
Office Action issued on Jan. 16, 2024, in corresponding Chinese Application No. 202080094476.X, 18 pages.
Office Action issued on Sep. 26, 2023, in corresponding Japanese Application No. 2022-558294, 10 pages.

* cited by examiner

ELECTROCHEMICAL DEVICE

CROSS-REFERENCE TO RELATED APPLICATIONS

This application is a Bypass Continuation and claims priority to PCT International Application: PCT/CN2020/081844, filed on Mar. 27, 2020, the whole disclosure of which is incorporated herein by reference.

TECHNICAL FIELD

This application relates to the field of electrochemical devices, and in particular, to a lithium-ion battery.

BACKGROUND

Lithium-ion batteries are widely used in the field of consumer electronics by virtue of many advantages such as a high energy density, a long cycle life, a high nominal voltage (higher than 3.7 V), and a low self-discharge rate. In recent years, with rapid development of electric vehicles and portable electronic devices, people are posing higher requirements on the energy density, safety, cycle performance, and the like of the lithium-ion batteries, and are expecting the rollout of a new lithium-ion battery with overall performance enhanced comprehensively. One of eye-catching new technologies is to dispose a separation layer between a positive electrode and a negative electrode of the lithium-ion battery to replace the conventional ordinary separator.

The existing technology that replaces the ordinary separator between the positive electrode and the negative electrode of the lithium-ion battery is primarily implemented by preparing a polymer layer and/or a ceramic layer on a surface of an electrode plate by means of scrape coating. Main drawbacks of the existing technology are as follows: Uniformity of the polymer layer is relatively low, and a weight and a thickness per unit area vary greatly between different parts; a porosity of the polymer layer is relatively low, thereby blocking a lithium ion transport path on the surface of the electrode plate and severely deteriorating rate performance of the lithium-ion battery; in the preparation process implemented by means of scrape coating, a large amount of solvent needs to be used, thereby causing damage to an active material and a binder on the surface of the electrode plate; and the adhesion between the ceramic layer and the electrode plate is relatively weak, thereby resulting in safety hazards. Therefore, a new material or structure needs to be developed to replace the conventional separator.

SUMMARY

An objective of this application is to provide an electrochemical device that works without a conventional separator.

A first aspect of this application provides an electrochemical device, including electrode plates and a separation layer formed on a surface of an electrode plate. The separation layer includes a porous layer formed on the surface of the electrode plate. The porous layer includes nanofibers. It takes 15 seconds or less for an electrolytic solution to infiltrate into the separation layer.

In some embodiments of the first aspect of this application, the separation layer is characterized by at least one selected characteristic from the group consisting of:

(a) an air permeability of the separation layer is 5 s/100 $cm^3$ to 400 s/100 $cm^3$ calculated by assuming that a thickness of the separation layer is 20 μm;

(b) a porosity of the separation layer is 30% to 95%;

(c) an average pore diameter of the porous layer is 20 nm to 10 μm; and (d) the thickness of the separation layer is 1 μm to 20 μm.

In some embodiments of the first aspect of this application, a diameter of the nanofibers is 0.1 nm to 2 μm.

In some embodiments of the first aspect of this application, the nanofibers include at least one of polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, polyvinylidene difluoride-hexafluoropropylene, or polyvinylidene difluoride-chlorotrifluoroethylene.

In some embodiments of the first aspect of this application, the separation layer further includes a polymer layer. The polymer layer overlays the porous layer. A thickness of the polymer layer is 0.05 μm to 4 μm. A percentage of an overlay area of the polymer layer on the porous layer is 10% to 70%.

In some embodiments of the first aspect of this application, the polymer layer includes a polymer agglomerate, and the polymer agglomerate is characterized by at least one selected characteristic from the group consisting of:

(a) a maximum overlay area of a single polymer agglomerate in the polymer layer is $1\times10^{-5}$ $mm^2$ to 1 $mm^2$, and preferably 0.001 $mm^2$ to 0.05 $mm^2$;

(b) a depth by which the polymer aggregate in the polymer layer penetrates into the porous layer is 0.01% to 80% of a thickness of the porous layer; and (c) the depth by which the polymer aggregate in the polymer layer penetrates into the porous layer is 10% to 80% of a thickness of the polymer agglomerate.

In some embodiments of the first aspect of this application, the polymer layer takes on a regular pattern.

In some embodiments of the first aspect of this application, the separation layer further includes an inorganic compound layer. The inorganic compound layer includes inorganic particles, and the inorganic compound layer overlays the porous layer.

In some embodiments of the first aspect of this application, the inorganic compound layer is characterized by at least one selected characteristic from the group consisting of:

(a) some inorganic particles in the inorganic compound layer penetrate into the porous layer;

(b) a depth by which the inorganic particles in the inorganic compound layer penetrate into the porous layer is 0.01% to 80% of a thickness of the porous layer;

(c) an electronic resistivity of the inorganic compound layer is greater than 107 Ω·m;

(d) an ionic conductivity of the inorganic compound layer is $10^{-8}$ S/cm to $10^{-2}$ S/cm;

(e) a thickness of the inorganic compound layer is 0.1 μm to 20 μm; and (f) a porosity of the inorganic compound layer is 10% to 40%, and a pore diameter thereof is 0.001 μm to 8 μm.

In some embodiments of the first aspect of this application, the inorganic compound layer is disposed by spraying or deposition.

In some embodiments of the first aspect of this application, the inorganic compound layer and the porous layer are bonded together by hot-pressing or bonding.

In some embodiments of the first aspect of this application, an average pore diameter of the porous layer in a thickness direction varies.

In some embodiments of the first aspect of this application, the average pore diameter of the porous layer in a region of the porous layer closer to the electrode plate is less than the average pore diameter in a region farther away from the electrode plate.

In some embodiments of the first aspect of this application, the porous layer is prepared by electrospinning, air spinning, or centrifugal spinning.

A second aspect of this application provides an electronic device. The electronic device includes the electrochemical device according to the first aspect of this application.

In the electrochemical device according to the technical solution of this application, a porous layer is disposed on the surface of an electrode plate (such as a positive pole plate and/or a negative electrode plate) to replace the ordinary separator, thereby serving functions of isolating electrons and conducting ions. Further, the porous layer is thinner and more electrolyte-retainable than the ordinary separator, thereby enabling the electrochemical device to achieve a relatively high energy density.

BRIEF DESCRIPTION OF DRAWINGS

To describe the technical solutions in the embodiments of this application or the prior art more clearly, the following outlines the drawings to be used in the embodiments of this application or the prior art. Evidently, the drawings outlined below merely illustrate some embodiments of this application, and a person of ordinary skill in the art may derive other drawings from such drawings without making any creative effort.

DETAILED DESCRIPTION

Figure 1:
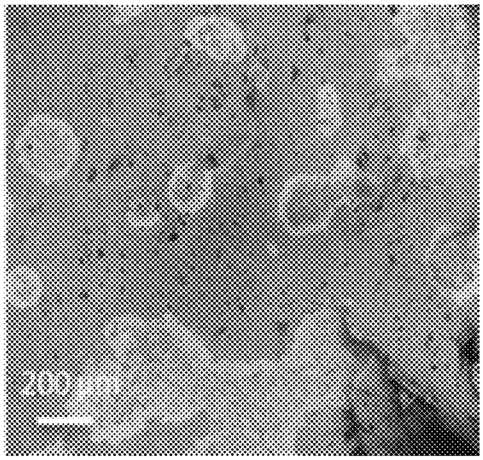
FIG. 1 is an SEM image (500×) of a surface of a separation layer of an electrochemical device according to Embodiment 1.

To make the objectives, technical solutions, and advantages of this application clearer, the following describes this application in further detail with reference to drawings and embodiments. Evidently, the described embodiments are merely a part of but not all of the embodiments of this application. All other embodiments derived by a person skilled in the art based on the embodiments of this application without making any creative efforts fall within the protection scope of this application.

The electrochemical device according to this application may be any electrochemical device that uses an electrode plate well known by a person skilled in the art and that uses a separation layer according to this application, and may be, for example, a lithium-ion battery, a sodium-ion battery, a magnesium-ion battery, or a super capacitor. The following description uses a lithium-ion battery as an example. A person skilled in the art understands that the following description is merely exemplary but does not limit the protection scope of this application.

This application provides an electrochemical device, including electrode plates and a separation layer formed on a surface of an electrode plate. The separation layer includes a porous layer formed on the surface of the electrode plate. The porous layer includes nanofibers. It takes 15 seconds or less for an electrolytic solution to infiltrate into the separation layer.

During assembling of a lithium-ion battery, an electrolytic solution is generally injected into a hermetic cavity (such as a packaging shell) by using a metering pump. The lithium-ion battery is put into an injection chamber, and then the injection chamber is vacuumized with a vacuum pump. A vacuum environment is also formed inside the lithium-ion battery. Subsequently, an injection nozzle is plugged into an injection port of the lithium-ion battery, an injection valve of the electrolytic solution is opened, and the injection chamber is pressurized with nitrogen. The pressure is kept for a given duration, and then the injection chamber is depressurized to a normal pressure. Finally, the lithium-ion battery stands statically for a long time, so that the electrolytic solution thoroughly infiltrates the positive electrode plate, the negative electrode plate, and the separation layer. Upon completion of injecting the electrolytic solution, the lithium-ion battery is sealed. Generally, during the electrolyte injection, the electrolytic solution first permeates into the separation layer, and then gradually permeates into positive and negative electrode materials. Therefore, a wettability is an important indicator of the lithium-ion battery. A conventional separator is mainly made of a polyethylene microporous film, or a polypropylene microporous film, or a polyethylene and polypropylene microporous film, and the wettability of the separator is limited. In this application, a separation layer containing nanofibers is disposed on the surface of the electrode plate. Therefore, it takes 15 seconds or less for the electrolytic solution to infiltrate into the separation layer, thereby significantly improving electrolyte wettability of the lithium-ion battery.

In addition, a good bonding force exists between the nanofiber porous layer and the electrode plate, thereby effectively preventing the conventional separator used in the lithium-ion battery from being folded after being flushed by the electrolytic solution in a process of dropping the lithium-ion battery drops, and in turn, improving safety of the lithium-ion battery.

The electrode plate referred to in this application may be a positive electrode plate and/or a negative electrode plate, and the separation layer may be disposed on the positive electrode plate and/or the negative electrode plate to isolate the positive electrode plate from the negative electrode plate. In addition, the separation layer may be disposed on one surface or both surfaces of the positive electrode plate or the negative electrode plate, without being limited in this application.

In some embodiments of this application, an air permeability of the separation layer is 5 s/100 $cm^3$ to 400 s/100 $cm^3$ calculated by assuming that a thickness of the separation layer is 20 μm. The inventor of this application finds that when the air permeability of the separation layer falls within the range specified above, the electrolyte permeability of the separation layer is improved significantly.

In some embodiments of this application, a porosity of the separation layer is 30% to 95%. When the porosity of the separation layer falls within the range specified above, the lithium-ion battery according to this application is of high wettability and ion-conductivity. In other embodiments of this application, an average pore diameter of the porous layer is 20 nm to 10 μm. When the pore diameter is less than 20 nm, the wettability declines, and the ion-conductivity decreases. When the pore diameter is greater than 10 μm, the pore diameter is excessive, and an active material in the electrode plate may penetrate the separation layer, resulting in a short circuit and self-discharge. When the thickness of the separation layer is deficient, the separation layer is unable to effectively isolate electrons between the positive electrode and the negative electrode, and the self-discharge increases. When the thickness of the separation layer is excessive, the energy density of the lithium-ion battery decreases significantly. In other embodiments of this application, the thickness of the separation layer ranges from 1 μm to 20 μm, and preferably from 2 μm to 18 μm, and more preferably from 5 μm to 15 μm, and optimally from 8 μm to 12 μm.

In some embodiments of this application, a diameter of the nanofibers is 0.1 nm to 2 μm. When the diameter of the nanofibers is deficient, the strength of the nanofibers is low, and the nanofibers are prone to break during the preparation or use of the lithium-ion battery. Consequently, the separation layer is pierced by the active material particles of the electrode, and self-discharge occurs. When the diameter of the nanofibers is excessive, the space occupied by the nanofibers in the separation layer is excessive, and therefore, when the separation layer contains the same weight of nanofibers, the pore diameter of the separation layer may be excessive. When the separation layer keeps the same porosity, the content of the nanofibers decreases, resulting in a decrease in the strength of the separation layer and an excessive pore diameter.

In some embodiments of this application, the nanofibers include at least one of polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, polyvinylidene difluoride-hexafluoropropylene, polyvinylidene difluoride-chlorotrifluoroethylene, or other polymers. Preferably, the nanofibers include a lithium-ion conductor material such as at least one of polyvinylidene fluoride-hexafluoropropylene, polyvinylidene fluoride, polyacrylonitrile, polymethyl methacrylate, polyphenylene oxide, polypropylene carbonate, polyethylene oxide, or a derivative thereof. One of such polymers may be used alone, or two or more thereof may be used in combination.

In some embodiments of this application, the separation layer further includes a polymer layer. A thickness of the polymer layer is 0.05 μm to 4 μm. The polymer layer overlays the nanofiber porous layer. A percentage of an overlay area of the polymer layer on the nanofiber porous layer is 10% to 70%, and preferably 20% to 40%. The polymer layer is able to increase the mechanical strength of the separation layer, reduce a K value (a voltage drop of the battery per unit time, an indicator of a self-discharge rate of the battery, measured in mV/d). In addition, when large pores exist in the nanofiber porous layer, the polymer layer is able to cover the large pores and reduce the self-discharge. If the overlay area is deficient and exerts an insignificant effect in reducing the K value the effect in increasing the mechanical strength of the separation layer is also insignificant. The overlay area, if excessive, affects the ion transport of the separation layer, and reduces the rate performance. In addition, the polymer layer is also able to improve the performance of bonding between the separation layer and the electrode plate in contact with the surface of the polymer layer. This prevents a slide between the separation layer and the electrode plate during winding of the lithium-ion battery.

The polymer layer includes polymer agglomerates. A single polymer agglomerate means an agglomerate formed by agglomeration of one or more polymer secondary particles. The polymer agglomerate may be understood as an agglomerate that includes a plurality of polymer secondary particles, or as individual polymer secondary particles. Through in-depth research, the inventor of this application finds that, in order to achieve a good effect, a maximum overlay area of a single polymer agglomerate is $1\times10^{-5}$ $mm^2$ to 1 $mm^2$, and preferably 0.001 $mm^2$ to 0.05 $mm^2$. When a single polymer agglomerate is relatively small in size, the effect of bonding the electrode plate in contact with the polymer agglomerate is limited, and the capability of improving the pore diameter of the porous layer is deficient. In other words, the polymer agglomerate is unable to cover the large pores in the nanofiber porous layer, and therefore, is unable to prevent self-discharge effectively. An excessive size of a single polymer agglomerate impairs local ion transport, leads to inconsistent charge and discharge of the lithium-ion battery as a whole, and decreases the cycle capacity and the cycle capacity retention rate when the battery is charged or discharged at a high rate.

Figure 3:
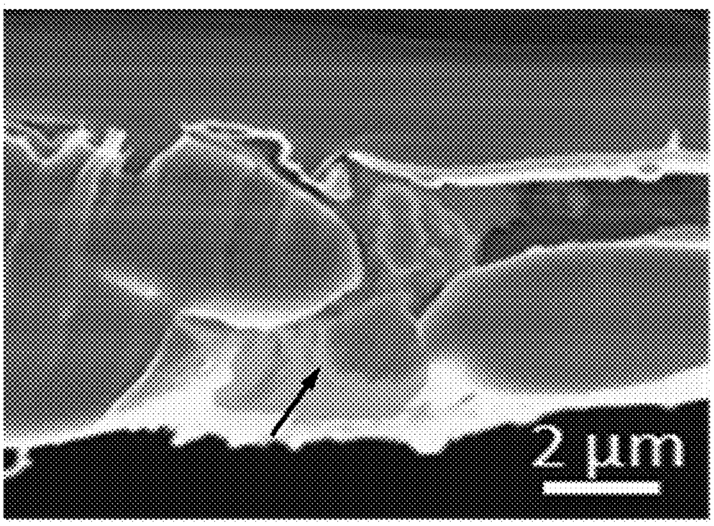
FIG. 3 is an SEM image of a cross-section of a separation layer of an electrochemical device according to Embodiment 1, in which an arrow indicates polymer agglomerate particles that penetrate into a porous layer.

In a preferred embodiment of this application, the polymer agglomerate penetrates into the porous layer, as shown in FIG. 3. The polymer agglomerate penetrating into the porous layer reduces the number of the large pores, that is, reduces the pore diameter on the one hand, and implements relative fixation of the polymer agglomerate in the porous layer on the other hand, thereby avoiding a slip. In addition, because the polymer agglomerate penetrates into the porous layer, the relative slip between nanofibers in the porous layer is also reduced. The inventor of this application finds that a depth by which the polymer aggregate penetrates into the porous layer is preferably 0.5 to 5 μm, and more preferably 1 to 2 μm. If the penetration depth is deficient, the pores in the porous layer can hardly be filled effectively, and the effect in reducing the self-discharge is limited. In addition, the deficient depth is adverse to strengthening a riveting effect and a bonding effect between the polymer agglomerate and the porous layer, and is unable to well prevent relative movement between the nanofibers in the porous layer, and relative movement between the polymer agglomerate and the nanofibers. An excessive depth of penetration impairs local ion transport, leads to inconsistent charge and discharge of the lithium-ion battery as a whole, and decreases the cycle capacity and the cycle capacity retention rate when the battery is charged or discharged at a high rate.

It is hereby noted that a polymer layer applied onto a conventional separator generally increases the thickness of the surface of the separator by 5 to 10 μm, and the thickness increment is very nonuniform. The thickness increment is larger at some positions where the polymer agglomerate is large. After the lithium-ion battery is filled with the electrolytic solution and hot-pressed, the thickness increment declines to 0.5 to 1 μm, but nonuniformity still exists. In contrast, when the polymer layer is applied onto the porous layer according to this application, the polymer agglomerate is applied merely onto the surface of the porous layer and increases the thickness by just 1 μm or less. The lithium-ion battery is thinner after being filled with the electrolytic solution and hot-pressed. Without being limited to any theory, the inventor holds that because the pores in the porous layer are relatively large, the polymer agglomerate penetrates into the pores, thereby posing little impact on the thickness of the separation layer.

In some preferred embodiments of this application, the depth by which the polymer agglomerate penetrates into the porous layer is 0.01% to 80% of the thickness of the porous layer. A deficient depth of penetration makes the polymer agglomerate unable to be riveted or bonded to the porous layer sufficiently. An excessive depth of penetration may make the effect of bonding not enough between the separation layer and the electrode plate.

In some preferred embodiments of this application, a percentage of the depth by which the polymer agglomerate penetrates into the porous layer is 10% to 80%, and preferably 40% to 60%, of the thickness of the polymer agglomerate. A deficient percentage of the penetration depth is adverse to increasing the effect of riveting and bonding between the polymer agglomerate and the porous layer, and the bonding force between the electrode plate and the separation layer is limited. An excessive percentage of the penetration depth reduces the area of the polymer agglomerate exposed outside, and is also adverse to the bonding of an interface between the electrode plate and the separation layer. A scanning electron microscopy (SEM) image of the penetration effect is shown in FIG. 3.

In some preferred embodiments of this application, the polymer layer may take on a regular pattern. The method for forming the pattern is not particularly limited, and may be any method known to a person skilled in the art. For example, transfer coating of the polymer layer may be performed by using a gravure cylinder inscribed with a special pattern. For another example, a part is blocked by a mask plate, and a part that needs to be coated with the polymer layer is exposed so as to be coated with the polymer layer. In this way, a polymer layer with a regular pattern is prepared. The pattern of the polymer layer is not particularly limited, and may be dotted, striped, block-shaped, line-shaped, or the like. The regular-patterned polymer layer makes the interface bonding force more evenly distributed, and fills the pores more uniformly, thereby reducing local residual large pores, and reducing risks of local short circuits caused by low mechanical strength at local positions.

The polymer configured to form the polymer layer is not particularly limited, and may be any polymer well known in the art, for example, one or more of polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, poly(vinylidene difluoride-co-hexafluoropropylene), poly(vinylidene difluoride-co-chlorotrifluoroethylene), or a derivative thereof. One of such polymers may be used alone, or two or more thereof may be used in combination.

In some preferred embodiments of this application, the separation layer may further include an inorganic compound layer that overlays the porous layer. The inorganic compound layer includes inorganic particles and a binder. The inorganic compound layer is able to further increase the mechanical strength of the separation layer and ensure good insulation performance, and reduce the electron-conductivity of the separation layer. Preferably, some inorganic particles in the inorganic compound layer penetrate into the porous layer. The effect of the inorganic particles being riveted to the nanofiber porous layer further increases the mechanical strength of the separation layer. Preferably, a depth by which the inorganic particles penetrate into the porous layer is 0.01% to 80% of a thickness of the porous layer. A deficient penetration depth of the inorganic particles results in an insignificant effect of riveting. An excessive penetration depth may run through the entire porous layer, and reduce the protective effect of the inorganic compound layer. Preferably, the electron resistivity of the inorganic compound layer is greater than 107 Ω·m, and more preferably greater than 1010 Ω·m, thereby reducing the electron-conductivity of the separation layer. Preferably, the inorganic compound layer is of good ionic conductivity. For example, the ionic conductivity of the inorganic compound layer is $10^{-8}$ S/cm to $10^{-2}$ S/cm. The thickness of the inorganic compound layer is not particularly limited, as long as the objectives of this application can be achieved. For example, the thickness of the inorganic compound layer is 0.1 μm to 20 μm. The porosity of the inorganic compound layer is not particularly limited, as long as the objectives of this application can be achieved. For example, the porosity of the inorganic compound layer is 10% to 40%, and the pore diameter thereof is 0.001 μm to 8 μm.

In a preferred embodiment of this application, the inorganic particles are inorganic compounds selected from $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, $SiO_2$, boehmite, magnesium hydroxide, aluminum hydroxide, and the like, or are a material capable of conducting lithium ions, for example, lithium phosphate ($Li_3PO_4$), lithium titanium phosphate ($Li_xTi_y(PO_4)_3$ in which 0<x<2 and 0<y<3), lithium aluminum titanium phosphate ($Li_xAl_yTi_z(PO_4)_3$ in which 0<x<2, 0<y<1, and 0<z<3), $Li_{1+x+y}$ (Al, Ga)$_x$(Ti, Ge)$_{2-x}$Si$_y$P$_{3-y}$O$_{12}$ (0<x≤1 and 0≤y≤1), lithium lanthanum titanate ($Li_xLa_yTiO_3$, where 0<x<2 and 0<y<3), lithium germanium thiophosphate ($Li_xGe_yP_zS_w$, where 0<x<4, 0<y<1, 0<z<1, and 0<w<5), lithium nitride ($Li_xN_y$, where 0<x<4 and 0<y<2), $SiS_2$ glass ($Li_xSi_yS_z$, 0≤x<3, 0<y<2, and 0<z<4), $P_2S_5$ glass ($Li_xP_yS_z$, where 0≤x<3, 0<y<3, and 0<z<7), $Li_2O$, LiF, LiOH, $Li_2CO_3$, $LiAlO_2$, $Li_2O—Al_2O_3—SiO_2—P_2O_5—TiO_2—GeO_2$ ceramic, and garnet ceramic ($Li_{3+x}La_3M_2O_{12}$, where 0≤x≤5, and M is Te, Nb, or Zr). One of such inorganic particles may be used alone, or two or more thereof may be used in combination.

The method for preparing the inorganic compound layer is not particularly limited, and may be any method well known in the art, for example, may be prepared by spraying or deposition, and preferably by electrospraying.

The method of bonding between the inorganic compound layer and the porous layer is not particularly limited, and may be any method well known in the art. For example, the inorganic compound layer may be bonded to the porous layer by hot-pressing or binding.

In a preferred embodiment of this application, an average pore diameter of the porous layer in the thickness direction varies, where the pore diameter means the diameter of the pores formed by nanofibers in the porous layer. The varying average pore diameters in the thickness direction can optimize the ion-conductivity of the porous layer, and prevent a short circuit or self-discharge caused by oversized pores. Preferably, the average pore diameter of the porous layer in a region of the porous layer closer to the electrode plate is less than the average pore diameter in a region farther away from the electrode plate.

The type of the lithium-ion battery according to this application is not particularly limited, and may be any type of lithium-ion battery, for example, a button-type, cylindrical, prismatic, pouch-type, or hard-case lithium-ion battery. The lithium-ion battery according to this application includes a positive electrode plate, a negative electrode plate, an electrolytic solution, and a separation layer according to this application.

In an embodiment of this application, the separation layer may be formed on a surface of the positive electrode plate and a surface of the negative electrode plate, and then the "negative electrode plate+separation layer" and the "positive electrode plate+separation layer" are stacked together to form a stacked structure of the lithium-ion battery. In another embodiment of this application, the separation layer may be formed on both surfaces of the positive electrode plate, and then the negative electrode plate, and the "separation layer+positive electrode plate+separation layer" may be stacked together to form a stacked structure of the lithium-ion battery, without applying a separation layer onto the surface of the negative electrode plate. In another embodiment of this application, the separation layer may be formed on both surfaces of the negative electrode plate, and then the "separation layer+negative electrode plate+separation layer" and the positive electrode plate are stacked together to form a stacked structure of the lithium-ion battery. The stacked structure formed in this way may be further stacked in the foregoing sequence, or may be wound directly to form a multilayer stacked structure of the lithium-ion battery. The stacking method is not particularly limited in this application, and may be selected by a person skilled in the art as actually required.

In embodiments of this application, the positive electrode plate is not particularly limited, as long as the objectives of this application can be achieved. For example, the positive electrode plate generally includes a positive current collector and a positive active material layer. The positive current collector is not particularly limited, and may be any positive current collector well known in the art. For example, the positive current collector may be a copper foil, an aluminum foil, an aluminum alloy foil, or a composite current collector. The positive active material layer includes a positive active material. The positive active material is not particularly limited, and may be any positive active material well known in the prior art. For example, the positive active material may include at least one of lithium nickel cobalt manganese oxide (NCM811, 622, 523, or 111), lithium nickel cobalt aluminum oxide, lithium iron phosphate, lithium cobalt oxide, lithium manganese oxide, lithium manganese iron phosphate, or lithium titanium oxide.

Optionally, the positive electrode plate may further include a conductive layer. The conductive layer is located between the positive current collector and the positive active material layer. The composition of the conductive layer is not particularly limited, and may be a conductive layer commonly used in the art. For example, the conductive layer may include a conductive agent and a binder.

In embodiments of this application, the negative electrode plate is not particularly limited, as long as the objectives of this application can be achieved. For example, the negative electrode plate generally includes a negative current collector and a negative active material layer. The negative current collector is not particularly limited, and may be any negative current collector known in the art, for example, a copper foil, an aluminum foil, an aluminum alloy foil, or a composite current collector. The negative active material layer includes a negative active material. The negative active material is not particularly limited, and may be any negative active material known in the art. For example, the negative active material layer may include at least one of artificial graphite, natural graphite, mesocarbon microbead, soft carbon, hard carbon, silicon, silicon carbon, lithium titanate, or the like.

Optionally, the negative electrode plate may further include a conductive layer. The conductive layer is located between the negative current collector and the negative active material layer. The composition of the conductive layer is not particularly limited, and may be a conductive layer commonly used in the art. For example, the conductive layer includes a conductive agent and a binder.

The conductive agent is not particularly limited, and may be any conductive agent well known in the art, as long as the objectives of this application can be achieved. For example, the conductive agent may be at least one selected from conductive carbon black (Super P), carbon nanotubes (CNTs), carbon fibers, Ketjen black, or graphene. For example, the conductive agent may be conductive carbon black (Super P). The binder is not particularly limited, and may be any binder well known in the art, as long as the objectives of this application can be achieved. For example, the binder may be at least one selected from polyvinylidene difluoride (PVDF), polyacrylic acid, polyacrylate, styrene-butadiene rubber (SBR), polyvinyl alcohol (PVA), polytetrafluoroethylene (PTFE), or sodium carboxymethyl cellulose (Na-CMC). For example, the binder may be styrene butadiene rubber (SBR).

The electrolytic solution of the lithium-ion battery is not particularly limited, and may be any electrolytic well known in the art. For example, the electrolytic solution may be in a gel state, a solid state, or a liquid state. For example, the liquid-state electrolytic solution may include a lithium salt and a nonaqueous solvent.

The lithium salt is not particularly limited, and may be any lithium salt known in the art, as long as the objectives of this application can be achieved. For example, the lithium salt may be at least one selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, or $LiPO_2F_2$. For example, the lithium salt may be $LiPF_6$.

The nonaqueous solvent is not particularly limited, as long as the objectives of this application can be achieved. For example, the nonaqueous solvent may be at least one selected from carbonate compound, a carboxylate compound, an ether compound, a nitrile compound, or another organic solvent.

For example, the carbonate compound may be at least one selected from diethyl carbonate (DEC), dimethyl carbonate (DMC), dipropyl carbonate (DPC), methyl propyl carbonate (MPC), ethylene propyl carbonate (EPC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, or trifluoromethyl ethylene carbonate.

The method for preparing an electrochemical device according to this application is not particularly limited. For example, the electrochemical device may be prepared by depositing nanofibers on one surface or both surfaces of the positive electrode plate or negative electrode plate to form a porous layer containing the nanofibers.

In a preferred embodiment, the method for preparing an electrochemical device according to this application further includes: depositing a polymer layer after the porous layer containing the nanofibers is deposited on the surface of the electrode plate.

The methods for depositing the nanofiber porous layer and the polymer layer are not particularly limited, and may be any deposition method well known in the art. For example, the porous layer may be prepared by electrospinning, air spinning, or centrifugal spinning, and the polymer layer may be prepared by electrospraying. For example, the nanofibers may be deposited first to form a porous layer, and then the polymer agglomerates are deposited to form a polymer layer on the superficial layer and the surface of the porous layer.

The porous layer may be prepared by using any spinning equipment known in the art, without being particularly limited, as long as the objectives of this application can be achieved. For example, the electrospinning equipment may be a Ucalery Elite series product; the air spinning equipment may be an air-jet spinning machine manufactured by Nanjing Janus New-Materials Co., Ltd.; and the centrifugal spinning equipment may be a centrifugal spinning machine manufactured by Sichuan Zhiyan Technology Co., Ltd. The electrospraying method may be implemented by any equipment known in the art, without being particularly limited, as long as the objectives of this application can be achieved. For example, the equipment may be electrostatic spraying equipment manufactured by Sames, France.

In a preferred embodiment, the preparation method according to this application further includes: depositing an inorganic compound layer after the porous layer containing the nanofibers is deposited on the surface of the electrode plate.

The method for depositing the inorganic compound layer is not particularly limited, and may be performed, for example, by electrodeposition. The nanofiber spinning of the porous layer and the deposition of the inorganic compound layer may be carried out simultaneously, or, the nanofiber porous layer is formed by spinning first, and then the inorganic compound layer is deposited; or, the nanofiber porous layer is deposited first, and then the inorganic compound layer is deposited, and this process is repeated to form a plurality of nanofiber porous substrates and inorganic compound layers alternately.

This application further provides an electronic device. The electronic device includes the electrochemical device according to this application.

The terms used in this application are generally terms that are commonly used by a person skilled in the art. If a term used herein is inconsistent with the commonly used terms, the term used in this application prevails.

Specifically, the following terms in this application have the following meanings:

Porosity: a percentage of the volume of pores in the separation layer or inorganic compound layer based on a total volume of the separation layer or inorganic compound layer, measurable by a mercury intrusion porosimetry method.

Thickness of polymer agglomerate: a thickness of a single polymer agglomerate in a direction perpendicular to the plane of the porous layer.

Test Methods

Self-Discharge Rate K Value of a Lithium-Ion Battery:

Discharging the lithium-ion battery at a current of 0.5 C until the voltage reaches 3.0 V, leaving the battery to stand for 5 minutes, then charging the lithium-ion battery at a constant current of 0.5 C until the voltage reaches 3.85 V, and then charging the battery at a constant voltage of 3.85 V until the current reaches 0.05 C. Leaving the battery to stand in a 25° C.±3° C. environment for two days, and measuring and recording the voltage OCV 1 at this time. Next, leaving the lithium-ion battery to stand in an environment of 25° C.±3° C. for two days, measuring and recording the voltage OCV2 at this time, and calculating a K value according to the following formula: K (mV/h)=(OCV2−OCV1)/48 h×1000.

Capacity Retention Rate:

Charging a lithium-ion battery at a constant current of 0.5 C until the voltage reaches 4.4 V, then charging the battery at a constant voltage of 4.4 V until the current reaches 0.05 C, leaving the battery to stand for 10 minutes in a 25° C.±3° C. environment, and then discharging the battery at a current of 0.5 C until the voltage reaches 3.0 V, and recording a first-cycle discharge capacity as $Q_1$. Repeating the foregoing charge and discharge process for 50 cycles, and then recording the discharge capacity at this time as $Q_{50}$. Calculating a $50^{th}$-cycle capacity retention rate $\eta$ according to the following formula: $\eta = Q_{50}/Q_1 \times 100\%$.

EMBODIMENTS

Preparation Example 1: Preparing a Negative Electrode Plate

Mixing artificial graphite as a negative active material, conductive carbon black, and the styrene butadiene rubber at a weight ratio of 96:1.5:2.5, adding deionized water as a solvent, blending the mixture into a slurry with a solid content of 70%, and stirring the slurry evenly. Coating an 8 μm-thick negative current collector copper foil with the slurry evenly on one surface of the foil, and drying the current collector at a temperature of 110° C. to obtain a negative electrode plate coated with a 130-μm-thick negative active material layer on a single side. Repeating the foregoing steps on the other surface of the negative current collector to obtain a negative electrode plate coated with a 130-μm-thick negative active material layer on both sides. Subsequently, cutting the negative electrode plate into a size of 41 mm×61 mm for future use.

Preparation Example 2: Preparing a Positive Electrode Plate

Mixing lithium cobalt oxide as a positive active material, conductive carbon black, and polyvinylidene difluoride at a mass ratio of 97.5:1.0:1.5, adding N-methyl-pyrrolidone NMP as a solvent, blending the mixture into a slurry with a solid content of 75%, and stirring the slurry evenly. Coating a 10-μm-thick positive current collector aluminum foil with the slurry evenly on one surface of the current collector, and drying the current collector at a temperature of 90° C. to form a positive active material layer that is 110 μm thick on one side of the positive current collector. Repeating the foregoing steps on the other surface of the positive current collector aluminum foil to obtain a positive electrode plate coated with a 110-μm-thick positive active material layer on both sides. Cutting, after completion of the coating, the positive electrode plate into a size of 38 mm×58 mm for future use.

Preparation Example 3: Preparing an Electrolytic Solution

Mixing ethylene carbonate (EC), ethyl methyl carbonate (EMC), and diethyl carbonate (DEC) at a weight ratio of EC:EMC:DEC=30:50:20 in an dry argon atmosphere to form a solvent, and then adding lithium salt hexafluorophosphate ($LiPF_6$) into the solvent to dissolve, and mixing the solution evenly to obtain an electrolytic solution in which a lithium salt concentration is 1.15 mol/L.

The following embodiments illustrate the preparation of an integrated separation layer of "nanofiber porous layer+polymer layer" according to this application. The embodiments are illustrated by using a positive electrode plate as an example, and an integrated separation layer is deposited on both surfaces of the positive electrode plate. Understandably, the integrated separation layer may also be deposited on both surfaces of the negative electrode plate instead, or an integrated separation layer is deposited on one surface of the positive electrode plate and one surface of the negative electrode plate separately. Such implementation solutions can also achieve the objectives of this application. In addition, the integrated separation layer may be an integrated separation layer of a "nanofiber porous layer+inorganic compound layer" instead. A person skilled in the art understands that such implementation solutions still fall within the protection scope of this application.

Embodiment 1

Making a 12-μm-thick porous layer (from a component PVDF) on one surface of the positive electrode plate obtained in Preparation Example 2, where the porous layer is made by means of both electrospinning and air spinning, the average pore diameter is 150 nm, and the diameter of nanofibers is 600 nm.

Mixing polyvinylidene difluoride and polyacrylate at a weight ratio of 96:4, and dissolving the mixture in deionized water to form a polymer layer slurry, where $D_{v50}$ of the polyvinylidene difluoride is 600 nm. Subsequently, coating a surface of the porous layer with the polymer layer slurry evenly by a micro-gravure coating method, and drying to obtain a polymer layer.

Figure 2:
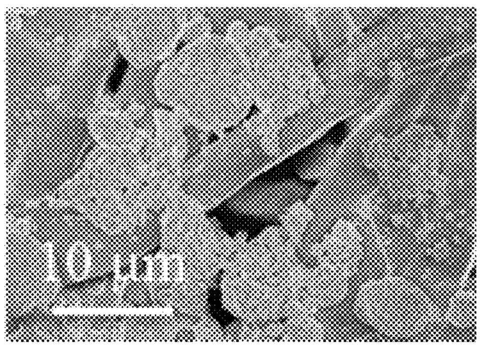
FIG. 2 is an SEM image (2000×) of a surface of a separation layer of an electrochemical device according to Embodiment 1.

The percentage of a total overlay area of the polymer layer is 10%, a maximum overlay area of a single polymer agglomerate is 0.1 $mm^2$, and the depth by which the polymer agglomerate penetrates into the porous layer is 1 μm. A percentage of the depth by which the polymer agglomerate penetrates into the porous layer is 25% of the thickness of the polymer agglomerate. The percentage of the depth by which the polymer agglomerates penetrates into the porous layer is 8.3% of the thickness of the porous layer. The porosity of the separation layer is 80%, the thickness of the separation layer is 15 μm, and the air permeability is 112 s/100 $cm^3$ calculated by assuming that the thickness is 20 μm. Subsequently, repeating the foregoing steps on the other surface of the positive electrode plate, drying at a temperature of 90° C., and removing the solvent in the polymer layer to obtain a double-side-coated positive electrode plate. FIG. 1 and FIG. 2 show an SEM image of a surface of a separation layer.

Embodiment 2

Identical to Embodiment 1 except that the percentage of the total overlay area of the polymer layer is 30%, and the air permeability of the separation layer is 123 s/100 $cm^3$ calculated by assuming that the thickness is 20 μm.

Embodiment 3

Identical to Embodiment 1 except that the percentage of the total overlay area of the polymer layer is 70%, and the air permeability of the separation layer is 137 s/100 $cm^3$ calculated by assuming that the thickness is 20 μm.

Embodiment 4

Identical to Embodiment 2 except that the maximum overlay area of a single polymer agglomerate is $1\times10^{-5}$ $mm^2$, and the average pore diameter of the porous layer is 80 nm.

Embodiment 5

Identical to Embodiment 2 except that the maximum overlay area of a single polymer agglomerate is 0.01 $mm^2$, and the average pore diameter of the porous layer is 100 nm.

Embodiment 6

Identical to Embodiment 2 except that the maximum overlay area of a single polymer agglomerate is 1 $mm^2$, and the average pore diameter of the porous layer is 400 nm.

Embodiment 7

Identical to Embodiment 5 except that the depth by which the polymer aggregate penetrates into the nanofiber porous layer is 0.5 μm, and the percentage of the depth by which the polymer aggregate penetrates into the porous layer is 14% of the thickness of the polymer agglomerate.

Embodiment 8

Identical to Embodiment 5 except that the depth by which the polymer aggregate penetrates into the nanofiber porous layer is 0.8 μm, and the percentage of the depth by which the polymer aggregate penetrates into the porous layer is 21% of the thickness of the polymer agglomerate.

Embodiment 9

Identical to Embodiment 5 except that the depth by which the polymer aggregate penetrates into the nanofiber porous layer is 1.5 μm, and the percentage of the depth by which the polymer aggregate penetrates into the porous layer is 33% of the thickness of the polymer agglomerate.

Embodiment 10

Identical to Embodiment 5 except that the depth by which the polymer aggregate penetrates into the nanofiber porous layer is 3.0 μm, and the percentage of the depth by which the polymer aggregate penetrates into the porous layer is 50% of the thickness of the polymer agglomerate.

Embodiment 11

Identical to Embodiment 5 except that the depth by which the polymer aggregate penetrates into the nanofiber porous layer is 5.0 μm, the depth by which the polymer aggregate penetrates into the porous layer is 62.5% of the thickness of the polymer agglomerate.

Embodiment 12

Identical to Embodiment 5 except that the depth by which the polymer aggregate penetrates into the nanofiber porous layer is 8.0 μm, and the percentage of the depth by which the polymer aggregate penetrates into the porous layer is 72.5% of the thickness of the polymer agglomerate.

Embodiment 13

Identical to Embodiment 5 except that the polymer layer takes on a striped pattern.

Embodiment 14

Identical to Embodiment 5 except that the polymer layer takes on a dotted pattern.

Embodiment 15

Identical to Embodiment 5 except that the polymer layer takes on a block-shaped pattern.

Embodiment 16

Identical to Embodiment 5 except that the average pore diameter of the porous layer is adjusted to 500 nm.

Embodiment 17

Identical to Embodiment 5 except that the depth of the porous layer is adjusted to 4 μm, the depth by which the polymer aggregate penetrates into the porous layer is 1 μm, the thickness of the separation layer is 5 μm, and the percentage of the depth by which the polymer aggregate penetrates into the porous layer is 50% of the thickness of the polymer agglomerate.

Embodiment 18

Identical to Embodiment 5 except that the porosity of the separation layer is adjusted to 95%.

Embodiment 19

Identical to Embodiment 5 except that the nanofiber material is replaced with polyethylene oxide (PEO).

Embodiment 20

Making a 12-μm-thick porous layer (from a component PVDF) on one surface of the positive electrode plate obtained in Preparation Example 2, where the porous layer is made by means of both electrospinning and air spinning, the diameter of the nanofibers is 600 nm, the average pore diameter of the porous layer in a region closer to the positive electrode plate is 100 nm, the average pore diameter of the porous layer in a region farther away from the positive electrode plate is 500 nm, and the average pore diameter of the porous layer increases gradually from the region closer to the positive electrode plate to the region farther away from the positive electrode plate.

Mixing polyvinylidene difluoride and polyacrylate at a weight ratio of 96:4, and dissolving the mixture in deionized water to form a polymer layer slurry, where $D_{v50}$ of the polyvinylidene difluoride is 600 nm. Subsequently, coating a surface of the porous layer with the polymer layer slurry evenly by a micro-gravure coating method, and drying to obtain a polymer layer.

The percentage of a total overlay area of the polymer layer is 30%, a maximum overlay area of a single polymer agglomerate is 0.01 $mm^2$, and the depth by which the polymer agglomerate penetrates into the porous layer is 1.5 μm. A percentage of the depth by which the polymer agglomerate penetrates into the porous layer is 50% of the thickness of the polymer agglomerate. The percentage of the depth by which the polymer agglomerates penetrates into the porous layer is 8.3% of the thickness of the porous layer. The porosity of the separation layer is 80%, and the thickness of the separation layer is 15 μm. Subsequently, repeating the foregoing steps on the other surface of the positive electrode plate, drying at a temperature of 90° C., and removing the solvent in the polymer layer to obtain a double-side-coated positive electrode plate.

Embodiment 21

Preparing a Negative Electrode Plate

Mixing conductive carbon black, and the styrene butadiene rubber at a weight ratio of 95:5, adding deionized water as a solvent, blending the mixture into a slurry with a solid content of 80%, and stirring the slurry evenly. Coating an 8-μm-thick negative current collector copper foil with the slurry evenly on 2 surfaces of the current collector, and drying the current collector at a temperature of 110° C. to obtain a negative conductive layer that is 2 μm thick on a single side.

Mixing graphite as a negative active material, conductive carbon black, and the styrene butadiene rubber at a weight ratio of 96:1.5:2.5, adding deionized water as a solvent, blending the mixture into a slurry with a solid content of 70%, and stirring the slurry evenly. Coating the conductive layer with the slurry evenly, and drying at a temperature of 110° C. to obtain a negative electrode plate coated with a 130-μm-thick negative active material layer on a single side. Repeating the foregoing steps on the other surface of the negative electrode plate to obtain a negative electrode plate coated with the negative active material on both sides. Subsequently, cutting the electrode plate into a size of 41 mm×61 mm for future use.

Preparing a Positive Electrode Plate

Mixing conductive carbon black, and the styrene butadiene rubber at a weight ratio of 97:3, adding deionized water as a solvent, blending the mixture into a slurry with a solid content of 85%, and stirring the slurry evenly. Coating a 10-μm-thick positive current collector aluminum foil with the slurry evenly on 2 surfaces of the foil, and drying the current collector at a temperature of 110° C. to obtain a positive conductive layer that is 2 μm thick on a single side.

Mixing lithium cobalt oxide as a positive active material, conductive carbon black, and polyvinylidene difluoride at a mass ratio of 97.5:1.0:1.5, adding N-methyl-pyrrolidone NMP as a solvent, blending the mixture into a slurry with a solid content of 75%, and stirring the slurry evenly. Coating the positive conductive layer with the slurry evenly, and drying at a temperature of 90° C. to obtain a positive electrode plate coated with a 100-μm-thick positive active material layer on both sides. Cutting, after completion of the coating, the electrode plate into a size of 38 mm×58 mm for future use.

Subsequently, repeating the corresponding steps in Embodiment 5.

Embodiment 22

Using the positive electrode plate coated with a positive conductive layer and obtained in Embodiment 21, and preparing a separation layer according to the following steps.

Making a 12-μm-thick porous layer (from a component PVDF) on one surface of the positive electrode plate by means of both electrospinning and air spinning, where the average pore diameter is 100 nm, and the diameter of nanofibers is 600 nm.

Dispersing boehmite and sodium hydroxymethyl cellulose in a solvent of dimethylformamide and acetone mixed at a ratio of 7:3, and stirring well until the viscosity of the slurry is stable, so as to obtain a 40 wt % suspension as a slurry. Electrospraying the suspension onto the surface of the positive electrode plate with a porous layer to form an inorganic compound layer, of which the thickness is 3 μm, the electrical conductivity of is 108 Ω·m, the ionic conductivity is $10^{-5}$ S/cm, and the average pore diameter is 0.5 μm. The depth by which the inorganic particles penetrate into the porous layer is 8.3% of the thickness of the porous layer, and the thickness of the separation layer is 15 μm.

Embodiment 23

Making a 15-μm-thick porous layer (from a component PVDF) on a surface of the positive electrode plate obtained in Preparation Example 2, where the porous layer is made by means of electrospinning, the average pore diameter is 150 nm, the diameter of nanofibers is 600 nm, the porosity is 80%, and the air permeability is 112 s/100 $cm^3$ calculated by assuming that the thickness is 20 μm. Subsequently, repeating the foregoing steps on the other surface of the positive electrode plate, and drying at a temperature of 90° C. to obtain a positive electrode plate coated on both sides.

Preparing a Lithium-Ion Battery

Aligning the negative electrode plate prepared in Preparation Example 1 with the positive electrode plate coated with a separation layer and prepared in each embodiment, and stacking the electrode plates neatly. Fixing four corners of the entire stacked structure by using adhesive tape, and then placing the stacked structure into an aluminum plastic film package. Performing top-and-side sealing, injecting the electrolytic solution prepared in Preparation Example 3, and then sealing the package to obtain a stacked-type lithium-ion battery. In Embodiment 21, using the negative electrode plate in Embodiment 21 in place of the negative electrode plate in Preparation Example 1.

Comparative Embodiment 1

Using a 15 μm-thick polyethylene film as a separator, and placing the separator between the negative electrode plate and the positive electrode plate prepared in Preparation Examples 1 and 2. Aligning the negative electrode plate, the positive electrode plate, and the separator and stacking them neatly. Fixing four corners of the entire stacked structure by using adhesive tape, and then placing the stacked structure into an aluminum plastic film package. Performing top-and-side sealing, injecting the electrolytic solution prepared in the Preparation Example, and sealing the package to finally obtain a stacked-type lithium-ion battery.

Comparative Embodiment 2

Making a 15-μm-thick PVDF non-woven fiber layer by means of electrospinning on the surface of the positive electrode plate prepared in Preparation Example 2, and then blending a PVDF suspension, and making a dense PVDF coating layer on the surface of the fiber layer by scrape-coating. The fraction of coverage of the coating layer on the surface of the electrode plate is 100%. The average pore diameter of the fiber layer is 50 nm and the porosity is 80%. Subsequently, repeating the foregoing steps on the other surface of the positive electrode plate, and drying the solvent and dispersant in the coating layer at a temperature of 90° C. to obtain a double-side-coated positive electrode plate.

Aligning the coated negative electrode plate with the coated positive electrode plate, and stacking the plates. Fixing four corners of the entire stacked structure by using adhesive tape, and then placing the stacked structure into an aluminum plastic film package. Performing top-and-side sealing, injecting the electrolytic solution prepared in the Preparation Example, and sealing the package to finally obtain a stacked-type lithium-ion battery.

The data and test results of the embodiments and comparative embodiments are shown in Table 1.

TABLE 1

| | Percent age of total overlay area of polymer layer | Maximum overlay area of a single polymer agglomerate ($mm^2$) | Depth of penetration into porous layer (μm) | Percentage of depth into porous layer based on thickness of polymer agglomerate | Average pore diameter of porous layer (nm) | Thickness of separation layer (μm) | Porosity of separation layer |
|---|---|---|---|---|---|---|---|
| Comparative Embodiment 1 | — | — | — | — | — | 15 | 30% |
| Comparative Embodiment 2 | 100% | — | — | — | 50 | 15 | 80% |
| Embodiment 1 | 10% | 0.1 | 1.0 | 25% | 150 | 15 | 80% |
| Embodiment 2 | 30% | 0.1 | 1.0 | 25% | 150 | 15 | 80% |
| Embodiment 3 | 70% | 0.1 | 1.0 | 25% | 150 | 15 | 80% |
| Embodiment 4 | 30% | $1 \times 10^{-5}$ | 1.0 | 25% | 80 | 15 | 80% |
| Embodiment 5 | 30% | 0.01 | 1.0 | 25% | 100 | 15 | 80% |
| Embodiment 6 | 30% | 1 | 1.0 | 25% | 400 | 15 | 80% |
| Embodiment 7 | 30% | 0.01 | 0.5 | 14% | 100 | 15 | 80% |
| Embodiment 8 | 30% | 0.01 | 0.8 | 21% | 100 | 15 | 80% |
| Embodiment 9 | 30% | 0.01 | 1.5 | 33% | 100 | 15 | 80% |
| Embodiment 10 | 30% | 0.01 | 3.0 | 50% | 100 | 15 | 80% |
| Embodiment 11 | 30% | 0.01 | 5.0 | 62.5% | 100 | 15 | 80% |
| Embodiment 12 | 30% | 0.01 | 8.0 | 72.7% | 100 | 15 | 80% |
| Embodiment 13 | 30% | 0.01 | 1.0 | 25% | 100 | 15 | 80% |
| Embodiment 14 | 30% | 0.01 | 1.0 | 25% | 100 | 15 | 80% |
| Embodiment 15 | 30% | 0.01 | 1.0 | 25% | 100 | 15 | 80% |
| Embodiment 16 | 30% | 0.01 | 1.0 | 25% | 500 | 15 | 80% |
| Embodiment 17 | 30% | 0.01 | 1.0 | 50% | 100 | 5 | 80% |
| Embodiment 18 | 30% | 0.01 | 1.0 | 25% | 100 | 15 | 95% |
| Embodiment 19 | 30% | 0.01 | 1.0 | 25% | 100 | 15 | 80% |
| Embodiment 20 | 30% | 0.01 | 1.0 | 25% | 100-500 | 15 | 80% |
| Embodiment 21 | 30% | 0.01 | 1.0 | 25% | 100 | 15 | 80% |

TABLE 1-continued

| | | | | | | | |
|---|---|---|---|---|---|---|---|
| Embodiment 22 | — | — | — | — | 100 | 15 | 80% |
| Embodiment 23 | — | — | — | — | 150 | 15 | 80% |

| | Nanofiber material | Time taken to infiltrate (s) | Bonding force between separation layer and negative electrode plate (N/m) | Self-discharge rate (mV/h) | Ratio of 2 C specific discharge capacity to 0.1 C specific discharge capacity | Ratio of $50^{th}$-cycle discharge capacity to first-cycle discharge capacity (%) |
|---|---|---|---|---|---|---|
| Comparative Embodiment 1 | PE | 23 | 0.5 | 0.034 | 82.3% | 92.3% |
| Comparative Embodiment 2 | PVDF | 28 | 14.3 | 0.031 | 78.0% | 86.5% |
| Embodiment 1 | PVDF | 10 | 8.2 | 0.053 | 91.6% | 95.1% |
| Embodiment 2 | PVDF | 12 | 13.3 | 0.035 | 91.0% | 95.3% |
| Embodiment 3 | PVDF | 15 | 13.9 | 0.032 | 86.3% | 94.0% |
| Embodiment 4 | PVDF | 8 | 10.7 | 0.031 | 91.6% | 95.5% |
| Embodiment 5 | PVDF | 9 | 13.1 | 0.032 | 91.5% | 95.5% |
| Embodiment 6 | PVDF | 12 | 13.6 | 0.048 | 87.2% | 90.9% |
| Embodiment 7 | PVDF | 7 | 11.5 | 0.041 | 91.6% | 95.5% |
| Embodiment 8 | PVDF | 8 | 12.7 | 0.036 | 91.5% | 95.5% |
| Embodiment 9 | PVDF | 9 | 14.9 | 0.029 | 91.3% | 94.9% |
| Embodiment 10 | PVDF | 9 | 13.6 | 0.030 | 91.2% | 95.4% |
| Embodiment 11 | PVDF | 10 | 14.4 | 0.028 | 91.3% | 95.5% |
| Embodiment 12 | PVDF | 10 | 13.8 | 0.027 | 91.2% | 95.3% |
| Embodiment 13 | PVDF | 7 | 14.7 | 0.025 | 91.8% | 95.9% |
| Embodiment 14 | PVDF | 9 | 15.0 | 0.024 | 91.9% | 96.1% |
| Embodiment 15 | PVDF | 8 | 14.9 | 0.024 | 91.9% | 96.0% |
| Embodiment 16 | PVDF | 7 | 14.3 | 0.030 | 91.8% | 95.2% |
| Embodiment 17 | PVDF | 6 | 12.9 | 0.059 | 93.9% | 93.6% |
| Embodiment 18 | PVDF | 7 | 13.1 | 0.053 | 93.0% | 88.3% |
| Embodiment 19 | PEO | 9 | 14.7 | 0.027 | 91.6% | 92.7% |
| Embodiment 20 | PVDF | 7 | 16.2 | 0.028 | 92.7% | 96.5% |
| Embodiment 21 | PVDF | 9 | 14.3 | 0.028 | 94.2% | 96.8% |
| Embodiment 22 | PVDF | 10 | 14.5 | 0.023 | 94.1% | 97.1% |
| Embodiment 23 | PVDF | 9 | 4.2 | 0.091 | 92.3% | 94.8% |

As can be seen from Table 1, in contrast with Comparative Embodiment 1, the bonding force between the separation layer and the negative electrode in each embodiment of this application increases significantly, and the ratio of 2 C specific discharge capacity to 0.1 C specific discharge capacity increases significantly.

In contrast with Comparative Embodiment 2, the ratio of 2 C specific discharge capacity to 0.1 C specific discharge capacity increases significantly, and the ratio of 50th-cycle discharge capacity to first-cycle discharge capacity increases significantly, indicating that the cycle performance of the battery is improved significantly.

In addition, the separation layer in Embodiment 23 contains no polymer agglomerate. As can be seen from the comparison with other embodiments, after the polymer agglomerates are added, the bonding force between the separation layer and the negative electrode increases significantly, and the safety of the battery is improved.

What is described above is merely preferred embodiments of this application, but is not intended to limit this application. Any modifications, equivalent substitutions, and improvements made without departing from the spirit and principles of this application still fall within the protection scope of this application.

What is claimed is:

1. An electrochemical device, comprising an electrode plate and a separation layer formed on a surface of the electrode plate, wherein the separation layer comprises a porous layer formed on the surface of the electrode plate, the porous layer comprises nanofibers, and it takes 15 seconds or less for an electrolytic solution to infiltrate into the separation layer;

wherein the separation layer further comprises a polymer layer, and the polymer layer overlays the porous layer;

wherein the polymer layer comprises a polymer agglomerate; and wherein the polymer agglomerate in the polymer layer penetrates into the porous layer to a depth of 0.5 μm to 5 μm.

2. The electrochemical device according to claim 1, wherein the separation layer has at least one characteristic selected from the group consisting of:

(a) an air permeability of the separation layer is 5 s/100 $cm^3$ to 400 s/100 $cm^3$ calculated by assuming that a thickness of the separation layer is 20 μm;

(b) a porosity of the separation layer is 30% to 95%;

(c) an average pore diameter of the porous layer is 20 nm to 10 μm; and (d) the thickness of the separation layer is 1 μm to 20 μm.

3. The electrochemical device according to claim 1, wherein a diameter of the nanofibers is 0.1 nm to 2 μm.

4. The electrochemical device according to claim 1, wherein the nanofibers comprise at least one of polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, polyvinylidene difluoride-hexafluoropropylene, or polyvinylidene difluoride-chlorotrifluoroethylene.

5. The electrochemical device according to claim 1, wherein a thickness of the polymer layer is 0.05 μm to 4 μm, and a percentage of an overlay area of the polymer layer on the porous layer is 10% to 70%.

6. The electrochemical device according to claim 5, wherein the polymer agglomerate has at least one characteristic selected from the group consisting of:

(a) a maximum overlay area of a single polymer agglomerate in the polymer layer is $1\times10^{-5}$ $mm^2$ to 1 $mm^2$;

(b) the depth by which the polymer agglomerate in the polymer layer penetrates into the porous layer is 0.01% to 80% of a thickness of the porous layer; and (c) the depth by which the polymer agglomerate in the polymer layer penetrates into the porous layer is 10% to 80% of a thickness of the polymer agglomerate.

7. The electrochemical device according to claim 5, wherein the polymer layer has a regular pattern.

8. The electrochemical device according to claim 1, wherein an average pore diameter of the porous layer in a thickness direction varies.

9. The electrochemical device according to claim 8, wherein the average pore diameter of the porous layer in a region of the porous layer closer to the electrode plate is less than the average pore diameter in a region farther away from the electrode plate.

10. The electrochemical device according to claim 5, wherein a maximum overlay area of a single polymer agglomerate in the polymer layer is 0.001 $mm^2$ to 0.05 $mm^2$.

11. An electronic device, comprises an electrochemical device, the electrochemical device comprising an electrode plate and a separation layer formed on a surface of the electrode plate, wherein the separation layer comprises a porous layer formed on the surface of the electrode plate, the porous layer comprises nanofibers, and it takes 15 seconds or less for an electrolytic solution to infiltrate into the separation layer;

wherein the separation layer further comprises a polymer layer, and the polymer layer overlays the porous layer;

wherein the polymer layer comprises a polymer agglomerate; and wherein the polymer agglomerate in the polymer layer penetrates into the porous layer to a depth of 0.5 μm to 5 μm.

12. The electronic device according to claim 11, wherein the separation layer is characterized by at least one selected characteristic from the group consisting of:

(a) an air permeability of the separation layer is 5 s/100 $cm^3$ to 400 s/100 $cm^3$ calculated by assuming that a thickness of the separation layer is 20 μm;

(b) a porosity of the separation layer is 30% to 95%;

(c) an average pore diameter of the porous layer is 20 nm to 10 μm; and (d) the thickness of the separation layer is 1 μm to 20 μm.

13. The electronic device according to claim 11, wherein a diameter of the nanofibers is 0.1 nm to 2 μm.

14. The electronic device according to claim 11, wherein the nanofibers comprise at least one of polyvinylidene difluoride, polyimide, polyamide, polyacrylonitrile, polyethylene glycol, polyphenylene ether, polypropylene carbonate, polymethyl methacrylate, polyethylene terephthalate, polyethylene oxide, polyvinylidene difluoride-hexafluoropropylene, or polyvinylidene difluoride-chlorotrifluoroethylene.

15. The electronic device according to claim 11, wherein a thickness of the polymer layer is 0.05 μm to 4 μm, and a percentage of an overlay area of the polymer layer on the porous layer is 10% to 70%.

16. The electronic device according to claim 15, wherein the polymer agglomerate is characterized by at least one selected characteristic from the group consisting of:

(a) a maximum overlay area of a single polymer agglomerate in the polymer layer is $1\times10^{-5}$ $mm^2$ to 1 $mm^2$;

(b) the depth by which the polymer agglomerate in the polymer layer penetrates into the porous layer is 0.01% to 80% of a thickness of the porous layer; and (c) the depth by which the polymer agglomerate in the polymer layer penetrates into the porous layer is 10% to 80% of a thickness of the polymer agglomerate.

17. The electronic device according to claim 15, wherein a maximum overlay area of a single polymer agglomerate in the polymer layer is 0.001 $mm^2$ to 0.05 $mm^2$.

* * * * *